UNITED STATES PATENT OFFICE.

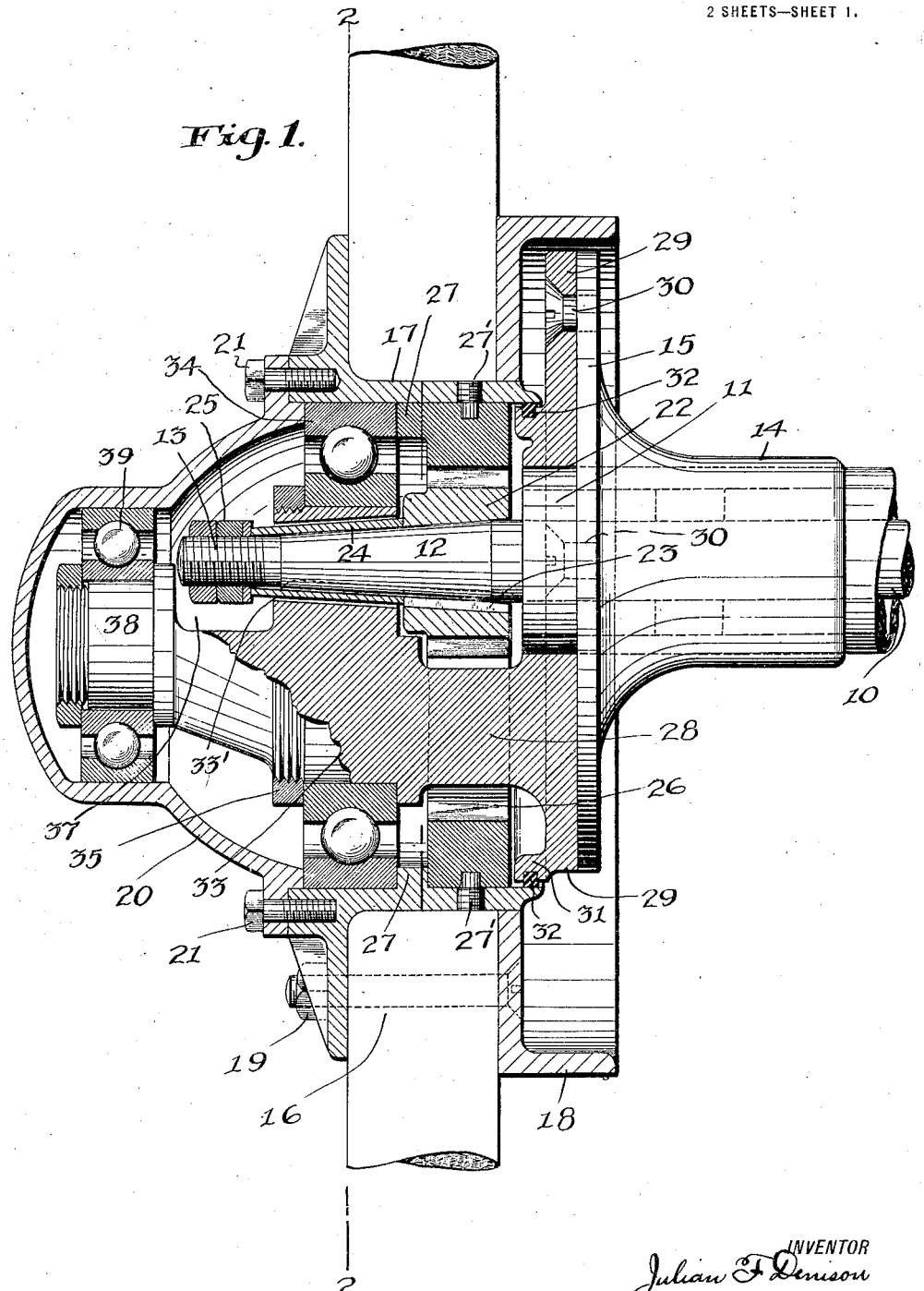

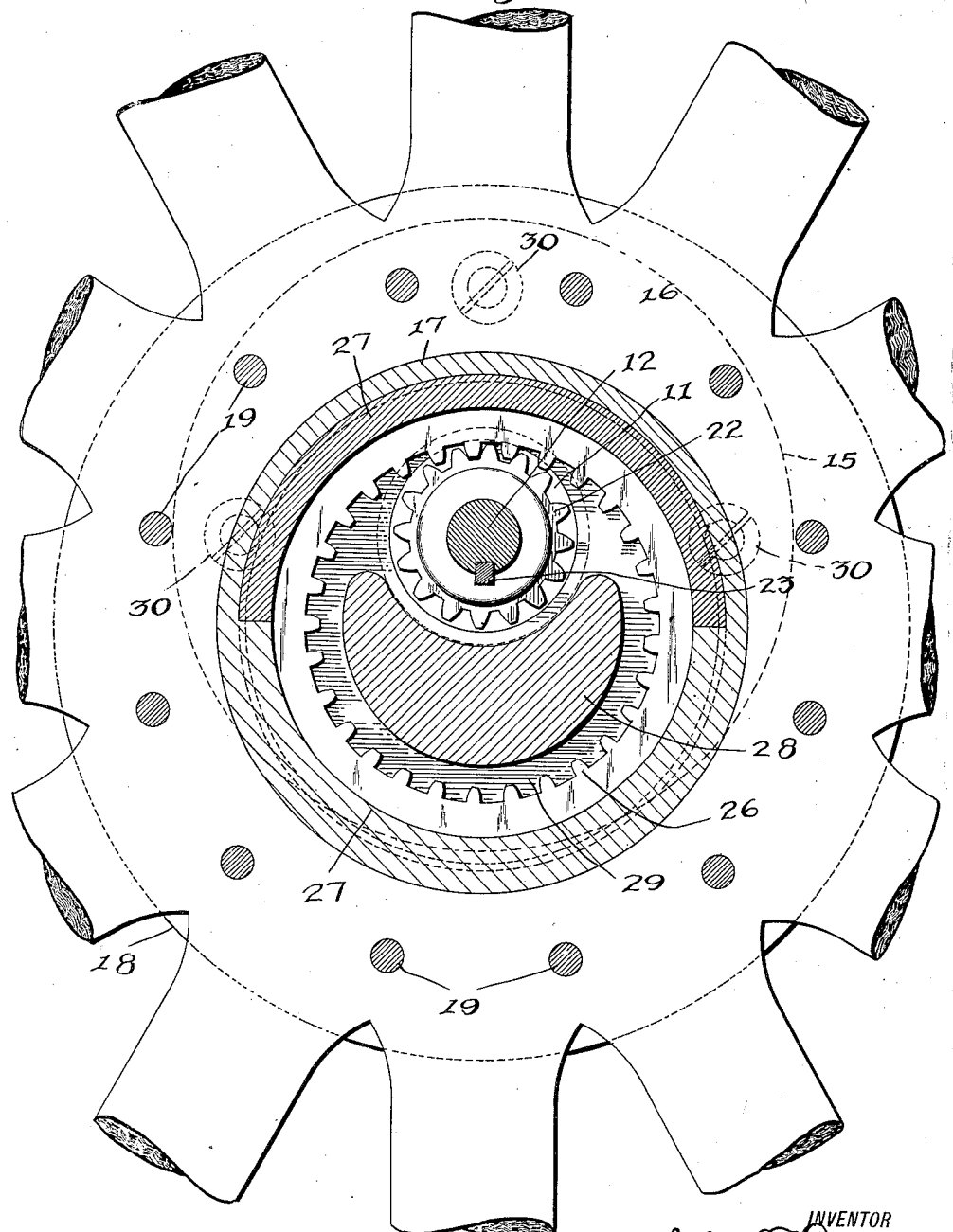

JULIAN F. DENISON, OF NEW HAVEN, CONNECTICUT.

VEHICLE WHEEL DRIVE.

1,427,584.   Specification of Letters Patent.   Patented Aug. 29, 1922.

Application filed April 18, 1918. Serial No. 229,268.

*To all whom it may concern:*

Be it known that I, JULIAN F. DENISON, a citizen of the United States, and resident of New Haven, in the county of New Haven and State of Connecticut, have invented certain new and useful Improvements in Vehicle Wheel Drives, of which the following is a specification.

My invention relates in general to a vehicle wheel drive of the type in which a high speed power plant may be utilized to drive the low speed traction wheels of a truck or other heavy commercial vehicle.

Specifically the invention relates to an improvement in such devices where a reducing gear train includes an internal gear fixed to the tractor wheel and which is driven through a pinion attached to the live axle of such a power plant. The axle is positioned eccentric of the axis of rotation of the wheel and except for its driving engagement with the wheel, is free of the wheel and its supporting vehicle parts.

In such devices it has been known to provide a bearing for the internal gear which bearing was in turn mounted within the driving pinion which was hollowed out to receive the mounting. This construction necessitated the use of a large pinion and in order to obtain the requisite reducing gear ratio between the pinion and gear the gear surrounding the pinion had to be made correspondingly large. There resulted a massive construction which was impossible to construct economically on a commercial scale and necessitated the use of a ball race for the gear which race was of so large a diameter as to be mechanically imperfect.

Accordingly, one of the objects of this invention is to provide a drive of the type outlined and in which the parts are compactly assembled so that strains incidental to such devices can be taken up by rigid, small and therefore relative light parts.

I attain this object by mounting on the floating axle the smallest possible pinion that will withstand the working strains thereon, and mounting on the wheel that size gear which will give the requisite reducing ratio between the gear and pinion. The wheel is rotatably mounted on the vehicle through the agency of anti-friction bearings positioned on a part of the vehicle constituting a bearing member which is confined within the outlines of the gear. The bearing member can thus be formed of sufficient mass to have a rigidity sufficient to eliminate vibratory movement without taking up any more space than is necessary to accommodate the requisite size gear.

Another object of the invention is to provide a mounting for an axle driven wheel which mounting will tend to minimize transverse rocking of the wheel without materially increasing the length of its hub or necessitating a reduction of axle length in conventional form of high speed pressure vehicles.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Referring to the accompanying drawings:

Figure 1 is a vertical sectional view taken axially through one end of a live vehicle axle and its housing, and showing a preferred embodiment of my invention in position thereon; and Figure 2 is a vertical sectional view taken on the line 2—2 of Figure 1.

In the drawings there is shown a live power axle 10 which includes a tapered portion 12 terminated in a threaded end 13. There is also shown one end of an axle housing 14 representing a part of the vehicle and terminating in a flared face plate 15, through which extends an axle bearing supporting tube 11, all as is shown in one well known form of axle and mounting, known commercially as a Ford axle.

The attachment particularly constituting the subject-matter of this invention includes a wheel 16 provided with a two-part hub 17, one part of which hub is provided with a brake drum 18. The parts of the hub are suitably fastened together by means of the through bolts 19 as is usual in a well known form of driven tractor wheel construction. The outer end of the hub is closed by means of a dome-shaped hub casing 20 fastened thereto by means of bolts 21.

A reducing gear train drives the wheel from the axle and includes a relatively small solid pinion 22 fixed to the tapered portion of the shaft 12 by means of a key 23. The pinion is held against displacement by means of a frusto-conical sleeve 24, loose on the tapered portion 12 and held in position by means of a lock nut 25 engaging the threaded portion 13 and bearing against the outer end of the sleeve 24. The axis of rotation of the pinion 22 is eccentrically positioned relative to the axis of rotation of the wheel and is positioned above said axis as shown in Figure 2. The pinion is constantly in preset meshing engagement with an internal gear 26 fitted within the hub 17 and fastened thereto by means of pins 27'. In order to prevent shearing of the pins 27' where heavy strains are transmitted the side of the gear and the hub are provided with interfitting semi-circular teeth 27. The gear train is positioned substantially in the plane of the wheel and in the particular form illustrated has a reducing gear ratio of 2 to 1, which ratio has been found to be particularly efficient in converting one form of pleasure vehicle into a commercial truck. In designing this construction it has been an object to make this pinion of the smallest possible size to withstand the strains incidental to its use in connection with heavy motors and similar vehicle trucks, and, in order to give the necessary strength, the pinion is made solid. In order to give the necessary resistance to shearing of the teeth in the gear sets, the teeth are made somewhat longer than the teeth of the gear sets in similar devices now known.

The wheel is rotatably mounted on the axle housing by means of a pair of bearings spaced apart longitudinally of the axis of the wheel and carried by a small but rigid bearing member fixed to the axle housing.

This construction is attained by means of a bearing member 28 constituting an extension from the axle housing and including a disk shaped attaching flange 29 conforming in outlines to and rigidly fastened to the face plate 15 by means of screws 30. The member is also carried by the portion of the tube 11 projecting forwardly of the face plate. The portion 11 extends through an opening provided in the attaching flange 29 and the attaching flange is provided with an annular band 31 which fits within the portion of the hub 17 adjacent to the gear 26. The band is provided with an annular recess containing a ring packing 32 which engages the inner face of the hub and coacts with the annular band 31 to inclose the reducing gear set and the bearings hereinafter described in a bath of some suitable lubricating substance.

The bearing member 28 is of massive, solid construction as shown in Figure 2 so as to minimize vibration and as shown in this figure is lunar shaped in cross-section and coacts with the pinion to fill substantially all of the available space within the driven gear 26. To the outside of the gear the bearing member is provided with an extension 33 between which extension and the gear is mounted an anti-friction bearing 34 held in place by a ring 35 threaded onto the extension. The bearing 34 is positioned close to the gear 26 and is disposed substantially in the plane of the wheel. The extension 33 is provided with a longitudinally extending opening 33' through which projects the axle and the pinion holding sleeve 24 mounted thereon. It is to be understood that the opening 33' has a diameter slightly greater than the external diameter of the sleeve so as to provide a clearance between the axle and bearing member. By this construction any wandering of the outer end of the axle from its normal position will have no effect upon the bearing member or the wheel rotatably mounted thereon.

In order to mount this device upon a conventional form of axle, the extension 33 is cut away to provide a recess 37 in which is positioned the outer end of the axle together with the lock nut 25. The outer end of the bearing member is cylindrical in form and is positioned within the hub casing 20 and constitutes an out-bearing extension 38 upon which is mounted on out-bearing anti-friction device 39 for rotatably mounting the hub casing on the bearing member. The anti-friction devices 34 and 39 are shown to be Hess bright bearings but it is understood that any suitable form of anti-friction devices or even bearing rings may be positioned between the bearing member 28 and the wheel drive casing formed of the hub and hub cases.

In operation and with the parts assembled as illustrated, power from the axle is transmitted through the reducing gear set formed by the pinion and internal gear and power is thus transmitted directly to the wheel through the hub 17. The wheel is free to rotate about its axis which is fixed relative to the axle housing 14 through the agency of the longitudinally spaced apart bearings 34 and 39. These bearings act to fix the axis of rotation of the wheel relative to the axle housing and minimize the possibility of the wheel rocking laterally of its axis.

By means of a device of this character a simple and direct form of drive is provided between the axle and wheel and at the same time the reducing driving mechanism is confined within a space only slightly greater than the conventional wheel hub of motor driven trucks. This reduction in space is primarily attained by the positioning of the bearing member within the large gear of the gear train. The rigidity of the wheel mounting is attained by virtue of the far spacing of the anti-friction bearings while appropriating the wide bearing support provided by the face plate of the axle mounting.

This construction also features a construction in which the depth of the mounting axially has been made as small as possible while maintaining the conventional axle in case it should be desired to remount the usual passenger vehicle wheel on this axle. The construction eliminates the necessity of a mounting for the wheels separate from the usual axle housing.

Having thus described my invention, I claim:

1. In a device of the class described, the combination with a driving axle having one end tapered and adapted normally to receive a wheel so as to drive the wheel directly from the axle, a pinion fixed to the axle in spaced relation to its free end, a wheel provided with a hub having an internal gear meshing with the pinion to be driven thereby, an axle housing spaced from the free end of the axle and disposed to one side of the wheel, of a bearing member constituting an extension from said housing projecting through the internal gear and disposed parallel to but in spaced relation to the free end of the axle whereby the axle is free to vibrate without interference from the bearing member and a bearing between the extension and the wheel.

2. In a device of the class described, the combination with an axle housing provided with a circular upstanding face plate, of an attachment demountably affixed to said face plate, including a bearing member constituting an extension of said housing and confined within the horizontally projecting outlines of the face plate, a wheel for supporting said axle housing and a plurality of circular bearings each having a diameter less than the diameter of said plate and disposed concentrically of the axle, spaced apart in the direction of the axis of said wheel and positioned between the wheel and said bearing member with one of the bearings disposed substantially in the plane of the wheel and another of said bearings being positioned at the end of the bearing member and coacting to provide a pair of bearings widely spaced apart along the axis of the wheel and confined within the projected outlines of the axle housing.

3. In a device of the class described, the combination with a vehicle provided with a power axle having its axis of rotation fixed relative to the vehicle, and having a portion adapted to receive a wheel hub, of a wheel provided with a hub casing projecting to one side thereof, a wheel supported member positioned to extend substantially along the axis of rotation of the wheel, a pair of bearings spaced apart in the direction of said axis and disposed between the wheel and said wheel supported member, one of said bearings being positioned substantially in the plane of the wheel and the other bearing positioned between the outer end of the axle and said hub casing and disposed in a plane in spaced relation to the end of the axle.

4. In a device of the class described, the combination with a wheel, a wheel supported member positioned to extend substantially along the axis of rotation of the wheel, a pair of bearings spaced apart in the direction of said axis and disposed between the wheel and said wheel supported member, a driving axle eccentrically disposed relative to the axis of the wheel, said axle provided adjacent its outer end with a part adapted to receive the hub of a wheel and a reducing internal gear drive between the wheel and said axle, said drive and one of said bearings being disposed relatively close together in horizontal alignment and disposed substantially within the outlines of the hub of the wheel and the other bearing disposed in a plane in spaced relation externally of the axle.

5. In a device of the class described, the combination of a wheel provided with a cap having means for attaching the same to the hub of the wheel, a bearing member, a pair of bearings spaced apart in the direction of the axis of said wheel for rotatably mounting the wheel on said bearing member, one of said bearings positioned between the outer end of said bearing member and said cap, a driving axle provided with a wheel engaging part extending through one of the bearings and terminating in advance of the other bearing, a pinion carried by said axle spaced from the end thereof and an internal gear carried by the wheel and meshing with said pinion to be driven thereby.

6. In a device of the class described, the combination of a wheel hub with a bearing member extending solidly along the axis of the wheel, said member provided at one end with an attaching flange, two spaced apart bearings between the hub and member, the portion carrying one of the bearings provided with an opening for receiving a power axle and said member also provided on one side of said portion with a pinion receiving recess for accommodating a pinion on the axle.

7. In a device of the class described, the combination with a wheel provided with a hub, a brake drum carried by said hub and a hub casing, an internal gear fixed to the hub, a bearing member extending through the gear substantially filling the space within the gear and provided with an attaching flange positioned within the outlines of said brake drum, a live axle extending through the attaching flange and the gear, a bearing offset outwardly beyond the end of the axle and positioned between the bearing member and said hub casing, a second bearing disposed between the bearing member and the hub and a pinion fixed to the axle and meshing with said gear.

8. In a device of the class described, the combination with an axle having a threaded end and a tapered portion adjacent the end, a pinion mounted on said portion, a nut on said threaded end and a spacing sleeve between said nut and pinion and coacting with the nut to assist in holding the pinion against displacement, of an attachment including a wheel hub, a gear fixed to the hub and meshing with said pinion, a bearing member including an extension provided with an opening for accommodating said sleeve, and a bearing carried by the extension for rotatably mounting the hub on the bearing member.

9. In a device of the class described, the combination with an axle having a threaded end and a tapered portion adjacent the end, a pinion mounted on said portion, a nut on said threaded end and a spacing sleeve between said nut and pinion and coacting with the nut to assist in holding the pinion against displacement, of an attachment including a wheel hub, a gear fixed to the hub and meshing with said pinion, a bearing member including an extension provided with an opening for accommodating said sleeve, a bearing carried by the extension for rotatably mounting the hub on the bearing member, said bearing member provided with an out-bearing extension, and a bearing carried by said out-bearing extension and coacting with said first named bearing to mount the hub on the bearing member.

10. In a device of the class described, the combination of a hub, a bearing member extending along the axis of the wheel, said member provided along its length in order with means for securing the member to the axle housing, a recess for accommodating a pinion, a bearing carrying portion, a recess for permitting the turning of axle nuts and a portion for carrying an out-bearing.

11. In a device of the class described, the combination of a hub, a bearing member extending along the axis of the wheel, said member provided along its length in order with means for securing the member to the axle housing, a recess for accommodating a pinion, a bearing carrying portion, a recess for permitting the turning of axle nuts and for permitting the turning of axle nuts and a portion for carrying an out-bearing, said first named bearing carrying portion provided with an axle receiving opening.

Signed at New York city, in the county of New York and State of New York, this eleventh day of April, A. D., 1918.

JULIAN F. DENISON.